(12) United States Patent  
Toft et al.

(10) Patent No.: US 9,234,693 B2  
(45) Date of Patent: Jan. 12, 2016

(54) CRYOGENIC COOLING APPARATUSES AND SYSTEMS

(71) Applicant: L-3 Communications Cincinnati Electronics Corporation, Mason, OH (US)

(72) Inventors: J. Brian Toft, Cincinnati, OH (US); Fred Nicol, Morrow, OH (US)

(73) Assignee: L-3 Communications Cincinnati Electronics Corporation, Mason, OH (US)

( * ) Notice: Subject to any disclaimer, the term of this patent is extended or adjusted under 35 U.S.C. 154(b) by 280 days.

(21) Appl. No.: 14/067,332

(22) Filed: Oct. 30, 2013

(65) Prior Publication Data

US 2014/0123684 A1    May 8, 2014

Related U.S. Application Data

(60) Provisional application No. 61/721,520, filed on Nov. 2, 2012.

(51) Int. Cl.
| | |
|---|---|
| *F25B 9/00* | (2006.01) |
| *F25D 19/00* | (2006.01) |
| *G01J 1/02* | (2006.01) |
| *G01J 3/02* | (2006.01) |
| *G01J 5/06* | (2006.01) |

(52) U.S. Cl.
CPC .............. *F25D 19/006* (2013.01); *G01J 1/0252* (2013.01); *G01J 1/0271* (2013.01); *G01J 3/0286* (2013.01); *G01J 3/0291* (2013.01); *G01J 5/061* (2013.01)

(58) Field of Classification Search
CPC ....................................................... F25B 9/14
USPC ................................................................ 62/6
See application file for complete search history.

(56) References Cited

U.S. PATENT DOCUMENTS

| | | |
|---|---|---|
| 5,111,874 A | 5/1992 | Kosson |
| 5,365,746 A | 11/1994 | Warner et al. |
| 5,598,711 A | 2/1997 | Stubbs |
| 7,253,396 B2 | 8/2007 | Loiseau |
| 7,270,302 B1 | 9/2007 | Wong et al. |
| 2004/0031593 A1 | 2/2004 | Ernst et al. |
| 2008/0276626 A1* | 11/2008 | Xu .......................... F25B 9/145 62/6 |

OTHER PUBLICATIONS

"Advanced Infrared (IR) Sensor Components for Missile Defense" http://www.dodsbir.net/sitis/achives_topic.asp?Bookmark=29017.

* cited by examiner

*Primary Examiner* — Melvin Jones
(74) *Attorney, Agent, or Firm* — Dinsmore & Shohl LLP

(57) ABSTRACT

An image sensing apparatus includes a focal plane array and a cold shield thermally isolated from the focal plane array. The cryogenic cooling apparatus further includes a first cryocooler assembly comprising a first cold finger thermally coupled to the focal plane array. The first cryocooler assembly is configured to maintain a focal plane array operating temperature. The cryogenic cooling apparatus includes a second cryocooler assembly comprising a second cold finger thermally coupled to the cold shield. The second cryocooler assembly is configured to maintain a cold shield operating temperature that is different from the focal plane array operating temperature.

20 Claims, 5 Drawing Sheets

CRYOGENIC COOLING APPARATUSES AND SYSTEMS

CROSS-REFERENCE TO RELATED APPLICATIONS

The present specification claims priority to U.S. Provisional Application Ser. No. 61/721,520 filed Nov. 2, 2012 and entitled "DUAL CRYOCOOLERS FOR LARGE FORMAT IR SENSORS," and which is incorporated herein by reference.

BACKGROUND

Image sensing devices may be used in a variety of applications, including for example, guidance systems, medical imaging systems, and astronomical applications. Image sensing devices may include large format infrared sensors and high-density focal plane array assemblies, and may be fabricated from materials that operate at cryogenic temperatures. Cryogenic cooling systems may be provided to maintain a cryogenic temperature environment for the image sensing devices during use. However, different components of the image sensing device may have different operating temperature requirements. Also, cryogenic cooling systems may be large and heavy, which may lead to increased cost, weight, and complexity of the image sensing device the cryogenic cooling system is incorporated in.

Accordingly, a need exists for alternative cryogenic cooling systems and image sensing devices.

SUMMARY

In one embodiment, an image sensing apparatus includes a focal plane array and a cold shield thermally isolated from the focal plane array (FPA). The cryogenic cooling apparatus further includes a first cryocooler assembly comprising a first cold finger thermally coupled to the focal plane array. The first cryocooler assembly is configured to maintain a focal plane array operating temperature. The cryogenic cooling apparatus includes a second cryocooler assembly comprising a second cold finger thermally coupled to the cold shield. The second cryocooler assembly is configured to maintain a cold shield operating temperature that is different from the focal plane array operating temperature.

In another embodiment, an image sensing apparatus includes a first cryocooler assembly thermally coupled to a focal plane array, and a second cryocooler assembly thermally coupled to a cold shield. The cold shield is thermally isolated from the focal plane array. The cryogenic cooling system further includes a radiation shield positioned around the cold shield, a first cryocooler assembly controller communicatively coupled to the first cryocooler assembly, and a second cryocooler assembly controller communicatively coupled to the second cryocooler assembly. The first cryocooler assembly is operable to cool the focal plane array to a focal plane array operating temperature, and the second cryocooler assembly is operable to cool the cold shield to a cold shield operating temperature.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to image sensing apparatuses comprising dual cryocooler assembly cooling systems that may be used to cryogenically cool the image sensing apparatus or other devices that may benefit from cryogenic cooling. The dual cryocooler assembly cooling system includes separate cryocooler assemblies and cryocooler expanders, or cold fingers, to individually cryogenically cool separate components of an image sensing device to different operating temperatures. The dual cryocooler assembly cooling systems described herein may result in reduced overall power consumption, reduced weight, and reduced size of the image sensing device. Further, because costs of cryocooler assemblies increase significantly with increased cooling capacity required for a single large cryocooler, the overall cost of the image sensing device may be reduced.

For example, one embodiment of the image sensing device described herein includes a cold shield and a focal plane array. The cold shield may be thermally isolated from the focal plane array and may assist in providing a suitable operating environment for the focal plane array. The cold shield and the focal plane array may have different operating temperature requirements. The operating temperature of the cold shield and the focal plane array may each affect the performance of the cold shield, the focal plane array, or the image sensing device as a whole. In most embodiments, the focal plane array may have more stringent operating temperature tolerances and/or lower operating temperature requirements than the cold shield. Accordingly, a first cryocooler assembly may be thermally coupled to the focal plane array, and a second cryocooler assembly may be thermally coupled to the cold shield. Depending on the operating temperature requirements, the first and second cryocooler assemblies can be configured and independently programmed to provide a specific amount of cooling power needed to cool each of the focal plane array and the cold shield to their respective operating temperatures. Using separate cryocooler assemblies, each configured to generate a different amount of cooling power and/or maintain a different operating temperature, may increase efficiency and improve weight distribution of the image sensing device. Such dual cryocooler assemblies may also reduce the overall cost, size, power consumption, and weight of the image sensing device.

Embodiments discussed herein are directed towards certain image sensing apparatuses, which may be used in several applications, including guidance applications, medical imaging applications, manufacturing inspection applications, thermal imaging applications, and astrological applications where cooling system size, cost, weight, power consumption, and cooling capacity are important considerations.

Figure 1:
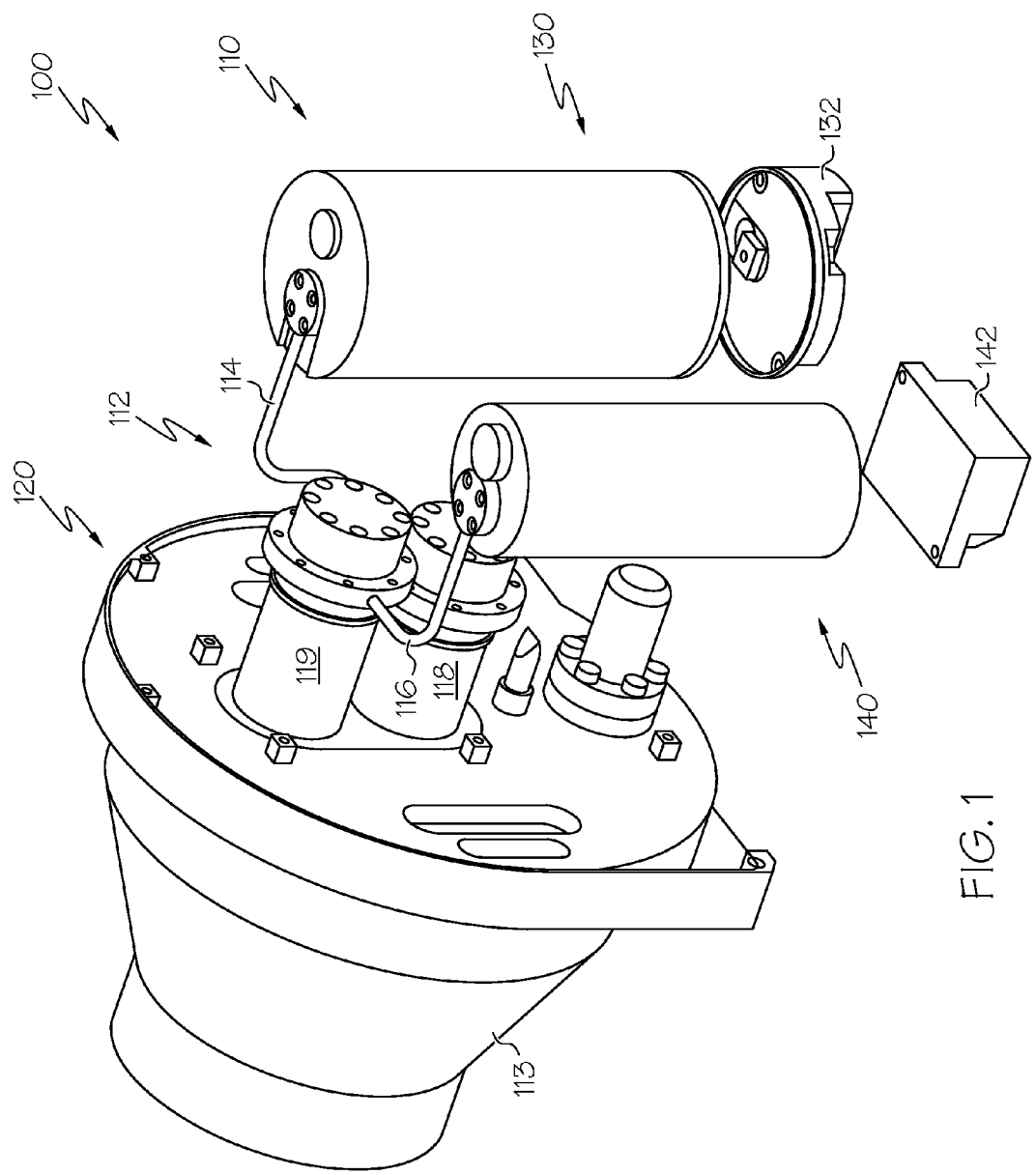
FIG. 1 depicts a perspective view of an image sensing apparatus according to one or more embodiments shown and described herein.

Referring now to FIG. 1, a schematic illustration of an image sensing apparatus 100 according to one embodiment is provided. In this embodiment, the image sensing apparatus 100 is configured as a closed-cycle, tactical integrated Dewar cooler image sensing device, including a cryogenic cooling system 110 and a detector Dewar assembly 120. Generally, the cryogenic cooling system 110 is coupled to the detector Dewar assembly 120 via connections 112. In some embodiments, the cryogenic cooling system 110 may be mounted on the detector Dewar assembly 120, while in other embodiments the cryogenic cooling system 110 may be removably attached to the detector Dewar assembly 120 or integrated into a housing 113 of the detector Dewar assembly 120.

The cryogenic cooling system 110 comprises a first cryocooler assembly 130 and a second cryocooler assembly 140. The first cryocooler assembly 130 is fluidically coupled to the detector Dewar assembly 120 via gas transfer line 114 and a first cold finger 150 (shown in FIG. 2) positioned within a housing tube 118. The second cryocooler assembly 140 is fluidically coupled to the detector Dewar assembly 120 via gas transfer line 116 and a second cold finger 152 (shown in FIG. 2) positioned within a housing tube 119. The gas transfer lines 114, 116 may be split lines that allow cooling fluids, such as helium gas, to be transferred to and from the first and second cryocooler assemblies 130, 140 to the first and second cold fingers 150, 152 positioned within the housing tubes 118, 119, as described below. Other cooling fluids may include, but are not limited to, hydrogen, oxygen, nitrogen and argon, for example.

The first and second cryocooler assemblies 130, 140 may be, for example, closed loop Stirling cycle mechanical refrigeration systems that comprise Stirling expanders. In other embodiments, the first and second cryocooler assemblies 130, 140 may comprise other expanders such as pulse tube expanders, for example. As discussed in detail below, the first and second cryocooler assemblies 130, 140 may each include a compressor and may be thermally coupled to the first and second cold fingers 150, 152, respectively, as an example and not a limitation. The compressors may include two pistons driven by magnetic fields that provide cooling power to regenerators positioned within the first and second cold fingers 150, 152.

The first cryocooler assembly 130 may include a first controller 132 communicatively coupled to the first cryocooler assembly 130. The first controller 132 may be integrated as part of the first cryocooler assembly 130 and may control and/or otherwise regulate operation of the first cryocooler assembly 130. In other embodiments, the first controller 132 may be separate from the first cryocooler assembly 130.

Similarly, the second cryocooler assembly 140 may include a second controller 142 communicatively coupled to the second cryocooler assembly 140. The second controller 142 may be integrated as part of the second cryocooler assembly 140 and may control and/or otherwise regulate operation of the second cryocooler assembly 140. In other embodiments, the second controller 142 may be separate from the second cryocooler assembly 140.

The first and second controllers 132, 142 may regulate the cooling power, or the isothermal expansion, generated by the first and second cryocooler assemblies 130, 140, respectively, and may further regulate the power consumption, or input power requirements, of each of the first and second cryocooler assemblies 130, 140. In some embodiments, the first and second cryocooler assemblies 130, 140 may dynamically adjust performance and/or operation of the first and second cryocooler assemblies 130, 140 based on changes in ambient temperature and the atmosphere surrounding the image sensing apparatus 100 that affect the operating temperature requirements of, for example, a focal plane array and/or a cold shield included in the detector Dewar assembly 120. While the first and second controllers 132, 142 are illustrated in FIG. 1 as integrated and non-detachable components of the first and second cryocooler assemblies 130, 140, respectively, in other embodiments the first and second controllers 132, 142 may be separate and/or detachable from the first and second cryocooler assemblies 130, 140. Separating the first and second controllers 132, 142 from the first and second cryocooler assemblies 130, 140 may allow for improved weight balancing of the image sensing apparatus 100, by allowing the first and second controllers 132, 142 to be positioned away from the first and second cryocooler assemblies 130, 140. Further, in some embodiments, a single controller may be communicatively coupled to both the first and second cryocooler assemblies 130, 140 and the single controller may be used to regulate operation of both the first and second cryocooler assemblies 130, 140. In such an embodiment, the single controller may be integrated as part of either the first or second cryocooler assemblies 130, 140, or may be separate from and positioned away from the first and second cryocooler assemblies 130, 140.

The first and second cryocooler assemblies 130, 140 may have different configurations, including different weights, shapes, sizes, and cooling capacities. The specific configuration of the first and second cryocooler assemblies 130, 140 may be dependent on the individual operating temperature requirements of the components being cooled by each of the first and second cryocooler assemblies 130, 140. For example, the configuration of the first cryocooler assembly 130 may be determined by the operating temperature requirements of a focal plane array, and the configuration of the second cryocooler assembly 140 may be determined by the operating temperature requirements of a cold shield. The operating temperature requirement of a focal plane array may be a temperature at which the focal plane array is optimally functional. As discussed below, a focal plane array may be comprised of pixels made of infrared sensitive materials. Similarly, the operating temperature requirement of a cold shield may be a temperature at which the cold shield is optimally functional.

Because the configuration of the first cryocooler assembly 130 may be different than the configuration of the second cryocooler assembly 140, the first and second cryocooler assemblies 130, 140 may have different physical dimensions. In embodiments where the first and second cryocooler assemblies 130, 140 have different dimensions, the first and second cryocooler assemblies 130, 140 may be positioned at different locations within, or disposed about, the image sensing apparatus 100 so as to achieve weight balancing of the overall image sensing apparatus 100. For example, in embodiments having a larger and/or heavier first cryocooler assembly 130, the first cryocooler assembly 130 may be positioned closer to a central axis of the image sensing apparatus 100, and the second cryocooler assembly 140 may be positioned so as to offset weight of other components included in the image sensing apparatus 100. Positioning the first and second cryocooler assemblies 130, 140 at different locations may also mitigate mechanical vibration generated by operation of each of the first and second cryocooler assemblies 130, 140. The first and second cryocooler assemblies 130, 140 may be arranged such that moving masses and drive parameters of each cryocooler offsets the other, which may provide dynamic balancing of the dual cryocooler system. Mitigation of vibration may lead to improved operation of a focal plane array assembly within the detector Dewar assembly 120, as described below.

Figure 2:
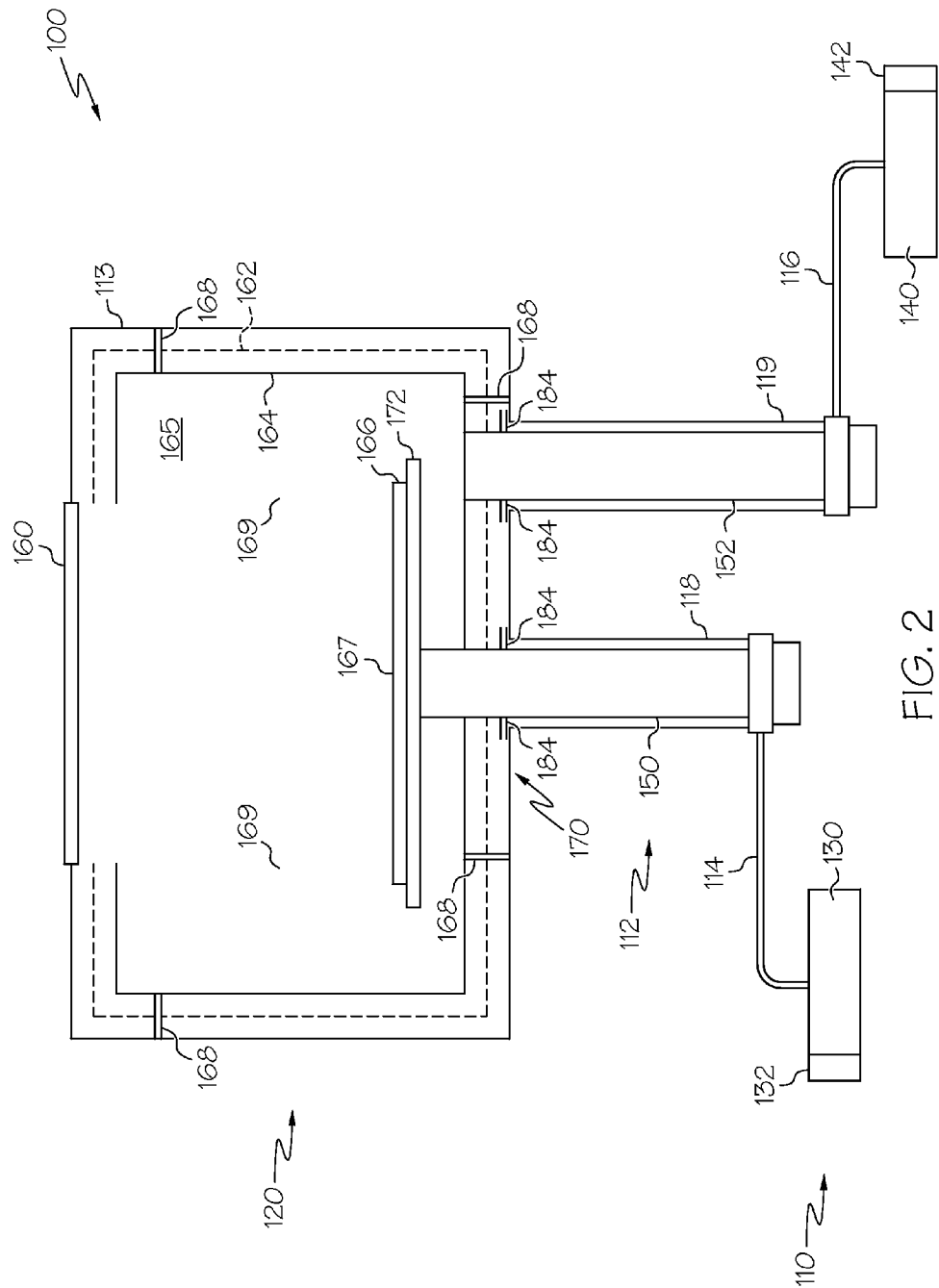
FIG. 2 depicts a schematic cross-sectional view of the image sensing apparatus of FIG. 1 according to one or more embodiments shown and described herein.
Figure 3:
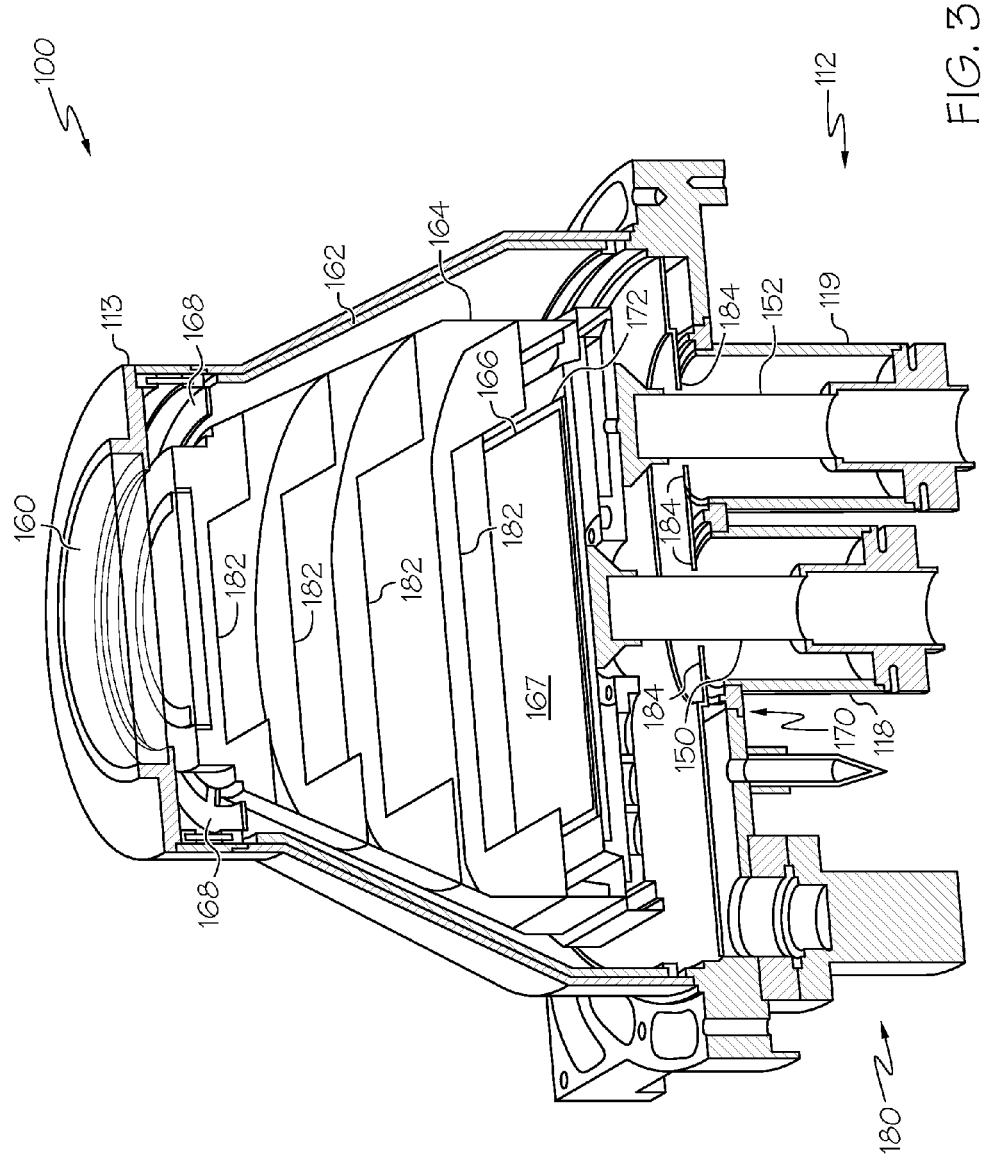
FIG. 3 depicts a cross-sectional view of the image sensing apparatus of FIG. 1 according to one or more embodiments shown and described herein.

Referring now to FIGS. 2 and 3, the image sensing apparatus 100 and the detector Dewar assembly 120 of the image sensing apparatus 100 are illustrated in schematic and cross-sectional view, respectively. Referring first to FIG. 2, the detector Dewar assembly 120 in this embodiment generally includes a housing 113, a window 160, a radiation shield 162, a cold shield 164, a focal plane array 166, and cold shield supports 168. The detector Dewar assembly 120 may further include a mounting base 170, a cold plate 172, and a getter subassembly 180 (shown in FIG. 3). As illustrated in FIG. 2, the housing 113 surrounds the internal components of the detector Dewar assembly 120 and provides protection from the operating environment of the image sensing apparatus 100. The housing may be comprised of any suitable material, such as metals, stainless steel, titanium, and aluminum, and may be constructed as a unitary and/or sealed component. The radiation shield 162 may be positioned in between the mounting base 170 and the cold shield 164. The cold plate 172 is positioned in between the cold shield 164 and the focal plane array 166. Accordingly, the cold plate 172 supports the focal plane array 166. The cold shield 164 is disposed around the focal plane array 166 and may be stabilized by the cold shield supports 168. The cold shield 164 may be interlocked with or otherwise mechanically attached to the mounting base 170 and may be coupled to the radiation shield 162 and/or housing 113. The housing 113 is positioned around the internal components (e.g. the focal plane array 166, the cold shield 164, the radiation shield 162, etc.) of the detector Dewar assembly 120 and is connected to the mounting base 170. The window 160 is coupled or attached to the housing 113 to complete the outer structure of the detector Dewar assembly 120. The window 160 may be comprised of, for example, plastic, glass, or any material configured to allow radiation to pass through the window 160.

The mounting base 170 is coupled to connections 112, including housing tubes 118, 119, that extend away from the mounting base 170. The connections 112 in the illustrated embodiment include the first housing tube 118 and the second housing tube 119. The first housing tube 118 passes through the mounting base 170 and into an aperture in the mounting base 170. The second housing tube 119 passes through the mounting base 170 and into another aperture in the mounting base 170. The first and second housing tubes 118, 119 may be cylindrical in shape, as illustrated in FIG. 2, or may have any other cross-sectional geometry including rectangular, triangular, and the like. Additionally, although the first and second housing tubes 118, 119 are both of the same geometry in this embodiment, in other embodiments the housing tubes may be of different dimensions and geometries. In some embodiments, the housing tubes 118, 119 may be integrated into the mounting base 170.

The radiation shield 162 may be positioned proximate to the housing 113. The housing 113 may include mounting posts that guide and secure the radiation shield 162 to the housing 113. The radiation shield 162 may reduce radiative thermal loads and assist in creating thermal isolation within the detector Dewar assembly 120. Radiation shield 162 may further prevent direct heat transfer from the cold shield 164 to the focal plane array 166, or from the focal plane array 166 to the cold shield 164. The radiation shield 162 may have various shapes and sizes and may conform to the geometry of the housing 113 and/or cold shield 164. The radiation shield 162 may be formed of materials including, but not limited to, copper, nickel, gold, and various metallic alloys, and may be secured to the mounting base 170 and/or the housing 113. In other embodiments, additional radiation shields may be positioned around the cold shield 164.

The focal plane array 166 may be positioned proximate to the cold plate 172, in embodiments that include the cold plate 172. In the illustrated embodiment of FIG. 2, the focal plane array 166 is positioned within an interior portion of the cold shield 164, and is thermally coupled to the cold plate 172, as discussed below. The focal plane array 166 may be coupled to the cold plate 172 through, for example, mechanical attachments or structures or thermal adhesives. The focal plane array 166 includes a focal plane 167 on one surface of the focal plane array 166. The focal plane 167 of the focal plane array 166 determines the resolution of the focal plane array 166. As an example and not a limitation, the focal plane array 166 may be a large-format focal plane array, and may have a resolution of at least four megapixels. The focal plane array 166 may also have a surface area greater than or equal to about 15 square centimeters.

The focal plane array 166 is exposed to radiation, such as infrared wavelengths of light that pass through the window 160. The focal plane array 166 is positioned such that the focal plane 167 is facing away from the cold plate 172. The focal plane 167 of the focal plane array 166 may comprise an array of two-dimensional light sensing pixels that may detect photons at specific wavelengths, such as infrared wavelengths, and generate an electric charge, voltage, or resistance relative to the number of photons detected by each pixel. The electric charge, voltage, or resistance may then be measured and digitized to construct an image, for example, of the object emitting the photons. Accordingly, the focal plane array 166 may be formed from a variety of materials sensitive to infrared radiation, including, but not limited to, indium antimonide (InSb), mercury cadmium telluride (MCT or HgCdTe), indium gallium arsenide (InGaAs), superlattice structures (SLS), or other infrared-sensitive materials. The focal plane array 166 may be configured to operate within long-wave infrared (e.g., 8-14 µm), mid-wave infrared (e.g., 3-5 µm), and/or short wave infrared bands. The materials used to form the focal plane array 166 may affect the operational temperature requirements for the focal plane array to achieve optimal performance. The focal plane array 166 may have very fine optical resolution when integrated with the appropriate optical system or image sensing apparatus. High performance of the image sensing apparatus, or image sensing apparatus 100, requires maintaining a very stable line of sight for the focal plane array 166. A line of sight 169 of the focal plane array 166 is illustrated in FIG. 2. Line of sight stabilization of the focal plane array 166 may be adversely affected by various system level disturbances, including vibration and poor weight balancing. As discussed herein, the present disclosure may provide for improved vibration mitigation and improved weight balancing.

Although illustrated as a rectangular focal plane array 166, other embodiments may include focal plane arrays of different geometries. As stated above, the focal plane array 166 achieves optimal performance at a focal plane array operating temperature. For example, an InSb focal plane array may have a focal plane array operating temperature of about 80 degrees Kelvin, while an InGaAs focal plane array may have a focal plane operating temperature of between about 300 degrees Kelvin and 200 degrees Kelvin. The focal plane operating temperature may be dependent upon the materials used to construct the focal plane array 166 and may vary dynamically based on the operating condition of the image sensing apparatus 100 and ambient environment. Accordingly, in embodiments where the first cryocooler assembly 130 is thermally coupled to the focal plane array 166, the first cryocooler assembly 130 independently provides cooling to the focal plane array 166 to ensure the focal plane operating temperature is reached and/or maintained.

In the embodiment illustrated in FIGS. 2 and 3, the cold plate 172 is positioned in between the cold shield 164 and the focal plane array 166. The cold plate 172 may be thermally coupled to the focal plane array 166, and the first cold finger 150 may be thermally coupled to the cold plate 172. The cold plate 172 may be a plate heat exchanger and may comprise a metal plate, such as stainless steel or aluminum, which allows for heat transfer. The cold plate 172 may increase the total surface area available for heat transfer between the focal plane array 166 and the first cold finger 150, and may increase the speed of temperature change. Some embodiments may not include a cold plate.

The cold shield 164 is positioned around the focal plane array 166 and cold plate 172, such that the focal plane array 166 and the cold plate 172 are within an interior cavity 165 of the cold shield 164. The cold shield 164 may be secured to the mounting base 170, and stabilized by the cold shield supports 168. The cold shield 164 may protect the focal plane array 166 from unwanted heat by thermal radiation. As shown in FIG. 3, the cold shield 164 may be a baffled cold shield. In FIG. 3, the interior cavity 165 of the cold shield 164 includes baffles 182. The baffles 182 may provide additional rigidity to the cold shield 164 structure and may stabilize other components positioned within the interior cavity 165 of the cold shield 164. In some embodiments, the cold shield 164 may be thermally isolated from the focal plane array 166. The cold shield 164 may have a cold shield operating temperature that is higher than the focal plane array operating temperature. The cold shield operating temperature may be the temperature required for the cold shield to maintain proper performance, or to provide a certain ambient temperature within the interior cavity 165 of the cold shield 164. Cold shield supports 168 are structures connected to the cold shield 164 and are used to stabilize the entire cold shield assembly.

The detector Dewar assembly 120 may include the window 160 to allow the focal plane array 166 to have the line of sight 169. More specifically, the window 160 may allow light to pass through the window 160 and onto the focal plane 167 of the focal plane array 166. The cold shield 164 may also comprise a window (not shown) to allow light, or specific wavelengths of light such as infrared light, to pass through the cold shield 164 and onto the focal plane 167 in some embodiments. In other embodiments, the cold shield 164 may comprise an opening instead of a window, as shown in FIGS. 2 and 3. The window 160 may be, for example, plastic or glass, and may include optically transparent coatings that minimize heat transfer into the detector Dewar assembly 120. The window 160 may be sized such that the optical field of view of the focal plane array 166 remains unobstructed. The getter assembly 180 may be included to maintain a vacuum within the detector Dewar assembly 120. The getter assembly 180 may include a reactive material deposit and may remove small amounts of fluid from the detector Dewar assembly 120 through an adsorption process. The getter assembly 180 may assist in maintaining a vacuum environment during operation of the image sensing apparatus 100 by removing residual gas produced within the system.

Referring once again to FIG. 2, the first cold finger 150 may be positioned within the first housing tube 118 and may pass through the aperture in the mounting base 170. Similarly, the second cold finger 152 may be positioned within the second housing tube 119 and may pass through another aperture in the mounting base 170. In some embodiments, the first and second cold fingers 150, 152 may be cylindrical in shape and may match the geometry of the first and second housing tubes 118, 119. In these embodiments, the diameters of the first and second cold fingers 150, 152 may be less than the diameter of the corresponding housing tube. Accordingly, support spiders 184 may be positioned at the apertures, or within the housing tubes 118, 119, to provide structural support to the first and second cold fingers 150, 152 and to resist movement of the first and second cold fingers 150, 152 within the first and second housing tubes 118, 119. The support spiders 184 may provide additional rigidity to the first and second cold fingers 150, 152, and may stabilize the first and second cold fingers 150, 152 while the image sensing apparatus 100 is in motion. The support spiders 184 may have spring properties and may be elastic, and may be comprised of metals, plastics, or other materials and combinations of materials.

The first cold finger 150 may be thermally coupled to the focal plane array 166 and to the first cryocooler assembly 130. The second cold finger 152 may be thermally coupled to the cold shield 164 and to the second cryocooler assembly 140. The first and second cold fingers 150, 152 may be cryocooler assembly expanders and operate to convert fluid, such as gas, provided from compressors of each of the first and second cryocooler assemblies 130, 140 into refrigeration capacity. The first and second cold fingers 150, 152 transport cooled gas from each respective cryocooler assembly and cycle the gas through tubing contained within the assembly. The refrigeration capacity may be transferred to the focal plane array 166 and the cold shield 164 by the first and second cold fingers 150, 152, respectively, and may cool the focal plane array 166 and the cold shield 164. Use of a dedicated focal plane array cold finger with a supplementary support element benefits the sensor systems ability to maintain center pixel stability due to an overall lower supported mass.

In the embodiment illustrated in FIG. 2, the first cryocooler assembly 130 is operable to provide cooling power that is transferred to the first cold finger 150 via gas transfer line 114. The first cold finger 150 is thermally coupled to the focal plane array 166 and transfers the cooling power of the first cryocooler assembly 130 to the focal plane array 166, thereby achieving the focal plane array operating temperature and maintaining optimal performance of the focal plane array 166. The first controller 132 may monitor the focal plane array temperature for example with temperature couplings that may be provided proximate the focal plane array 166, and may dynamically adjust the cooling power provided by the first cryocooler assembly 130 as needed. For example, in situations where the image sensing apparatus 100 is exposed to increased temperature, the first and second cryocooler assemblies 130, 140 may provide additional cooling, or if the focal plane array 166 is unaffected, only the second cryocooler assembly 140 may provide additional cooling to the cold shield 164.

Similarly, the second cryocooler assembly 140 is operable to provide cooling power that is transferred to the second cold finger 152 via gas transfer line 116. The second cold finger 152 is thermally coupled to the cold shield 164 and transfers the cooling power to the cold shield 164, thereby achieving the cold shield operating temperature, which may be different than the focal plane array operating temperature (e.g., higher than the focal plane array operating temperature). In embodiments where the cold shield operating temperature requires less cooling power than the focal plane array operating temperature, the second cryocooler assembly 140 may have a reduced cooling capacity than the first cryocooler assembly 130. Using cryocooler assemblies of different sizes and cooling capacities may assist in more efficient cooling, for example, in embodiments where the focal plane array 166 has an operating temperature that is lower than the cold shield operating temperature. The second controller 142 may also monitor the cold shield temperature for example with temperature couplings, and may dynamically adjust the cooling power provided by the second cryocooler assembly 140 as needed. In this embodiment, the first and second cryocooler assemblies 130, 140 may not be used as redundant backups for each other, in that the first cryocooler assembly 130 may not supply cooling power directly to a cold shield, and the second cryocooler assembly 140 may not supply cooling power directly to a focal plane array.

In some applications, image sensing devices may be exposed to elevated temperatures that affect the reliability and functionality of the image sensing devices. Using separate cryocooler assemblies for components of an image sensing device with different operating temperature requirements may result in lower cost cooling systems, more efficient cooling, improved weight balancing, reduced volume, and reduced weight.

The size and specifications of a cryocooler assembly affect its cost. The larger a cryocooler assembly is in size, the heavier it is in weight, and it may also consume more power and/or be more expensive. A large cryocooler assembly, however, generally has increased cooling capacity. When using a single cryocooler assembly, only one temperature regulation can be set as there is only a single compressor. By using a dual cryocooler assembly system with two compressors, however, two separate temperature requirements can be set and the size of a cryocooler assembly needed for a specific temperature requirement can be selected accordingly. Independent temperature control and system level thermal sizing allows the entire Dewar cooling assembly to be lighter in weight, smaller in size, and consume less power, as the total weight, size and power consumption of the dual cryocooler assemblies combined may be less than if a single cryocooler assembly was used for the same assembly. With dual cryocooler assemblies that are both smaller than a single large cryocooler assembly, the associated cost may also be reduced. Finally, the mechanical load and weight balance achieved with dual cryocooler assemblies may be more stable than a system utilizing a single cryocooler assembly.

Along with independent temperature control, a dual cryocooler assembly system may provide more efficient cooling. For the high-density focal plane arrays discussed herein, the heat load of the cold shield can surpass that of the focal plane array. By using a separate cryocooler assembly for the cold shield, the cooling process is more efficient as a single cryocooler assembly is responsible for cooling the heat shield and a separate cryocooler assembly is responsible for cooling the focal plane array.

Additionally, in embodiments where the first cryocooler assembly has a different weight than the second cryocooler assembly, the positioning of the first and second cryocooler assemblies within the overall Dewar cooling assembly may be modified so as to achieve weight balancing. For example, the first cryocooler assembly may be positioned on one side of the Dewar cooling assembly, and the second cryocooler assembly may be positioned on the opposite side of the Dewar cooling assembly, or at another position to counter the weight of the first cryocooler assembly or other components of the Dewar cooling assembly.

EXAMPLES

Figure 4:
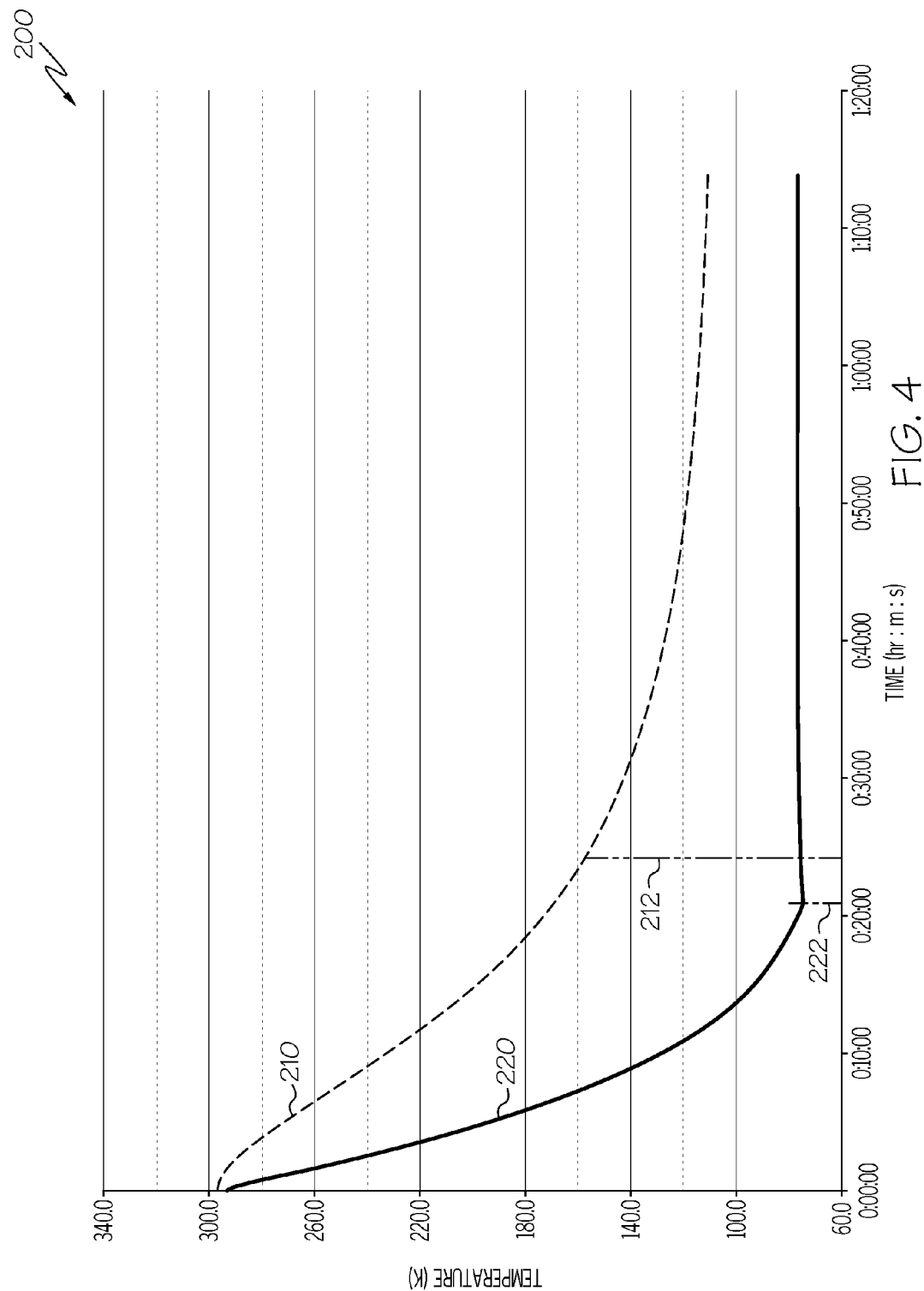
FIGS. 4 and 5 depict graphs illustrating focal plane array and cold shield cooldown times in an exemplary experiment, with FIG. 4 illustrating the results of an image sensing device comprising a single cryocooler assembly and FIG. 5 illustrating the results of an image sensing device according to one or more embodiments shown and described herein.
Figure 5:
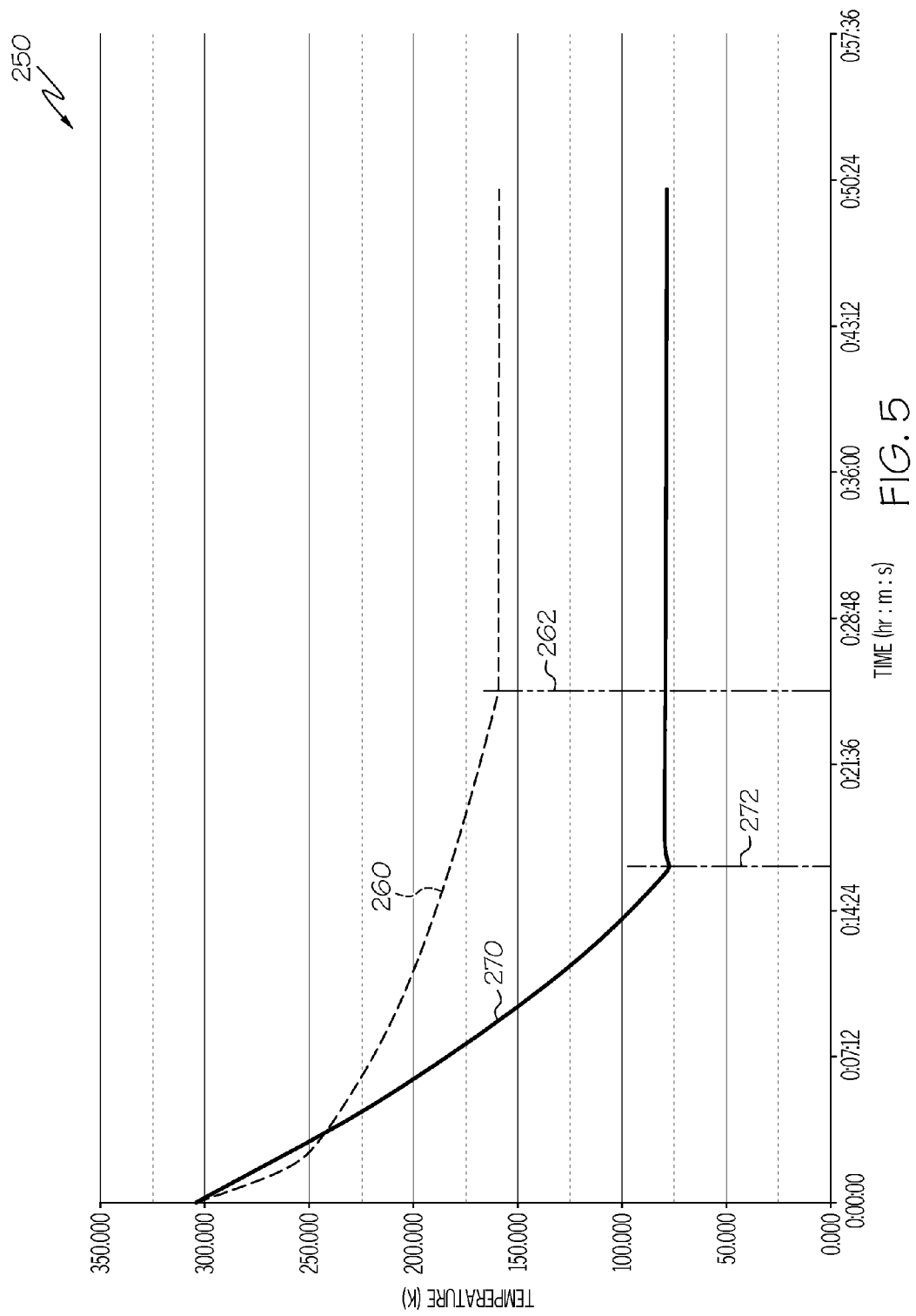

Referring now to FIGS. 4 and 5, the thermal efficiency of the image sensing device 100 and dual cryocooler assembly solution described herein has been experimentally tested. Two image sensing devices comprising large format infrared sensor focal plane arrays were fabricated for this experiment, with the first image sensing device comprising a single cryocooler and the second image sensing device comprising the present dual cryocooler assembly system described herein. Cooldown times for the focal plane array and the cold shield in each of the embodiments was measured, with temperature (degrees Kelvin) recorded over time (minutes and seconds). The target operating temperature for the cold shield in each embodiment was about 158 degrees Kelvin, and the target operating temperature for the focal plane array in each embodiment was about 75 degrees Kelvin. Each image sensing device was tested at an ambient temperature of 23 degrees Celsius. The first image sensing device comprising a single cryocooler had a total assembly weight of 9.5 pounds, while the second image sensing device comprising the present dual cryocooler assembly system had a total assembly weight of 5.8 pounds, for a weight reduction of approximately 39%.

FIG. 4 illustrates the measured results of a single cryocooler image sensing device, while FIG. 5 illustrates the measured results of a dual cryocooler image sensing device according to embodiments described herein. Each of graph in FIGS. 4 and 5 depicts the cooldown time of the focal plane array and the cold shield in the respective embodiment of the image sensing device.

Referring to FIG. 4, graph 200 illustrates the cooldown times for the single cryocooler embodiment of the image sensing device. Curve 210 depicts the cooldown, in temperature versus time, of the cold shield, while curve 220 depicts the cooldown of the focal plane array. As shown in FIG. 4, the cold shield reached a cold shield operating temperature of approximately 158 degrees Kelvin after about 24 minutes (shown as dashed curve 212), and the focal plane array reached a focal plane array operating temperature of approximately 75 degrees Kelvin after about 21 minutes (shown as dashed curve 222).

Referring now to FIG. 5, graph 250 illustrates the cooldown times for the dual cryocooler embodiment of the image sensing device. Curve 260 depicts the cooldown, in temperature versus time, of the cold shield, while curve 270 depicts the cooldown of the focal plane array. As shown in FIG. 5, the cold shield reached a cold shield operating temperature of approximately 158 degrees Kelvin after about 25 minutes (shown as dashed curve 262), and the focal plane array reached a focal plane array operating temperature of approximately 75 degrees Kelvin after about 16 minutes (shown as dashed curve 272).

Accordingly, while the cold shield cooldown performance was similar in both embodiments, the weight of the dual cryocooler embodiment was reduced by approximately 39%, along with reduced size and power consumption. Also, the cooldown performance of the focal plane array was improved by approximately 24%, from about 21 minutes down to about 16 minutes.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. The term "substantially" is further utilized herein to represent a minimum degree to which a quantitative representation must vary from a stated reference to yield the recited functionality of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An image sensing apparatus comprising:
   a focal plane array;
   a cold shield thermally isolated from the focal plane array;
   a first cryocooler assembly comprising a first cold finger thermally coupled to the focal plane array, the first cryocooler assembly configured to maintain a focal plane array operating temperature; and
   a second cryocooler assembly comprising a second cold finger thermally coupled to the cold shield, the second cryocooler assembly configured to maintain a cold shield operating temperature that is different from the focal plane array operating temperature.

2. The image sensing apparatus of claim 1, further comprising a cold plate thermally coupled to the focal plane array, wherein the first cold finger is thermally coupled to the cold plate.

3. The image sensing apparatus of claim 1, wherein the focal plane array has a surface area greater than or equal to about 15 square centimeters.

4. The image sensing apparatus of claim 1, wherein a cooling capacity of the first cryocooler assembly is different from a cooling capacity of the second cryocooler assembly.

5. The image sensing apparatus of claim 1, comprising a first cryocooler assembly controller communicatively coupled to the first cryocooler assembly and the second cryocooler assembly, the first cryocooler assembly controller configured to operate the first cryocooler assembly and the second cryocooler assembly.

6. The image sensing apparatus of claim 1, comprising a first cryocooler assembly controller communicatively coupled to the first cryocooler assembly and a second cryocooler assembly controller communicatively coupled to the second cryocooler assembly, the first cryocooler assembly controller configured to operate the first cryocooler assembly and the second cryocooler assembly controller configured to operate the second cryocooler assembly.

7. The image sensing apparatus of claim 6, wherein the first cryocooler assembly controller is integrated into the first cryocooler assembly and the second cryocooler assembly controller is integrated into the second cryocooler assembly.

8. The image sensing apparatus of claim 1, wherein the first and second cryocooler assemblies use Stirling expanders.

9. The image sensing apparatus of claim 1, wherein the first and second cryocooler assemblies use pulse tube expanders.

10. The image sensing apparatus of claim 1, wherein the focal plane array operating temperature is lower than the cold shield operating temperature.

11. The image sensing apparatus of claim 1, wherein the first cryocooler assembly and the second cryocooler assembly are positioned such that the image sensing apparatus is weight-balanced.

12. An image sensing apparatus comprising:
    a first cryocooler assembly thermally coupled to a focal plane array;
    a second cryocooler assembly thermally coupled to a cold shield, the cold shield thermally isolated from the focal plane array;
    a radiation shield positioned around the cold shield;
    a first cryocooler assembly controller communicatively coupled to the first cryocooler assembly; and
    a second cryocooler assembly controller communicatively coupled to the second cryocooler assembly;
    wherein the first cryocooler assembly is operable to cool the focal plane array to a focal plane array operating temperature, and the second cryocooler assembly is operable to cool the cold shield to a cold shield operating temperature.

13. The image sensing apparatus of claim 12, further comprising a cold plate thermally coupled to the focal plane array, wherein the first cryocooler assembly comprises a first cold finger thermally coupled to the cold plate.

14. The image sensing apparatus of claim 12, wherein a cooling capacity of the first cryocooler assembly is different from a cooling capacity of the second cryocooler assembly.

15. The image sensing apparatus of claim 12, wherein the first cryocooler assembly controller is integrated into the first cryocooler assembly and the second cryocooler assembly controller is integrated into the second cryocooler assembly.

16. The image sensing apparatus of claim 12, wherein the first and second cryocooler assemblies use Stirling expanders or pulse tube expanders.

17. The image sensing apparatus of claim 12, wherein the focal plane array operating temperature is lower than the cold shield operating temperature.

18. The image sensing apparatus of claim 12, wherein the first cryocooler assembly and the second cryocooler assembly are operable to dynamically adjust the focal plane array operating temperature and the cold shield operating temperature, respectively.

19. The image sensing apparatus of claim 12, wherein an assembly weight of the first cryocooler assembly is different from an assembly weight of the second cryocooler assembly.

20. The image sensing apparatus of claim 19, wherein the first cryocooler assembly and the second cryocooler assembly are positioned such that the image sensing apparatus is weight-balanced.

* * * * *